(12) United States Patent
Johnson, Jr.

(10) Patent No.: US 10,895,050 B1
(45) Date of Patent: Jan. 19, 2021

(54) WAVE DIVERTER DEVICE AND SYSTEM FOR RENOURISHING BEACHES

(71) Applicant: Joel T. Johnson, Jr., Bonita Springs, FL (US)

(72) Inventor: Joel T. Johnson, Jr., Bonita Springs, FL (US)

( * ) Notice: Subject to any disclaimer, the term of this patent is extended or adjusted under 35 U.S.C. 154(b) by 0 days.

(21) Appl. No.: 16/392,924

(22) Filed: Apr. 24, 2019

(51) Int. Cl.
*E02B 3/04* (2006.01)
*E02B 3/06* (2006.01)

(52) U.S. Cl.
CPC .............. *E02B 3/06* (2013.01); *E02B 3/046* (2013.01)

(58) Field of Classification Search
CPC .......... A01K 61/70; E02B 3/04; E02B 3/046; E02B 3/06; E02B 3/129; Y02A 40/83; Y02A 10/26
See application file for complete search history.

(56) References Cited

U.S. PATENT DOCUMENTS

| | | | |
|---|---|---|---|
| 2,474,786 A | 6/1949 | Humphrey | |
| 3,386,250 A | 6/1968 | Katayama | |
| 4,129,006 A * | 12/1978 | Payne | E02B 3/06 405/31 |
| 4,367,978 A | 1/1983 | Schaaf et al. | |
| 4,502,816 A | 3/1985 | Creter, Jr. et al. | |
| 4,539,078 A * | 9/1985 | Wingfield | C04B 32/00 205/150 |
| 4,711,598 A | 12/1987 | Schaaf et al. | |
| 4,747,023 A * | 5/1988 | Ball | B60Q 1/0683 362/269 |
| 4,997,311 A | 3/1991 | Van Doren | |
| 5,080,526 A | 1/1992 | Waters | |
| 5,123,780 A * | 6/1992 | Martinsen | E02B 3/06 405/25 |
| 5,173,006 A | 12/1992 | Lowe | |
| 5,224,794 A * | 7/1993 | Atkinson | E02B 3/06 405/32 |
| 5,259,695 A | 11/1993 | Mostkoff | |
| 5,836,265 A * | 11/1998 | Barber | A01K 63/006 119/221 |
| D417,314 S | 11/1999 | Smith, Jr. | |
| 6,186,702 B1 | 2/2001 | Bartkowski | |
| 6,824,327 B1 * | 11/2004 | Walter | A01K 61/70 405/33 |
| 7,029,200 B1 | 4/2006 | Cravens | |
| 7,165,912 B2 | 1/2007 | Herzog | |
| 7,513,711 B1 | 4/2009 | Walter | |
| 8,226,325 B1 | 7/2012 | Pierce, Jr. | |
| 9,403,287 B2 | 8/2016 | Hilton et al. | |
| 2003/0095833 A1* | 5/2003 | Janz | E02B 3/04 403/410 |

(Continued)

FOREIGN PATENT DOCUMENTS

WO    WO89/09308    10/1989

*Primary Examiner* — Carib A Oquendo
(74) *Attorney, Agent, or Firm* — Bryan L. Loeffler, Esq.; Loeffler IP Group, PA

(57) ABSTRACT

A substantially pyramid-shaped wave diverter (1) having circular-shaped ports (6). A system of wave diverters (14) may be placed in an ocean (16) side-by-side off a shoreline (17) and under the surface of water. The system of multiple wave diverters each have circular ports (6) located on each side, some of which may vary in size. The system of wave diverters divert the flow of sand toward the beach (18) and prevents further erosion from the beach.

2 Claims, 4 Drawing Sheets

(56) References Cited

U.S. PATENT DOCUMENTS

| | | | |
|---|---|---|---|
| 2016/0067883 A1* | 3/2016 | Hilton | B28B 1/32 264/300 |
| 2017/0342673 A1* | 11/2017 | O'Sullivan | E02B 3/06 |
| 2018/0317462 A1* | 11/2018 | Dounas | E02B 3/046 |

* cited by examiner

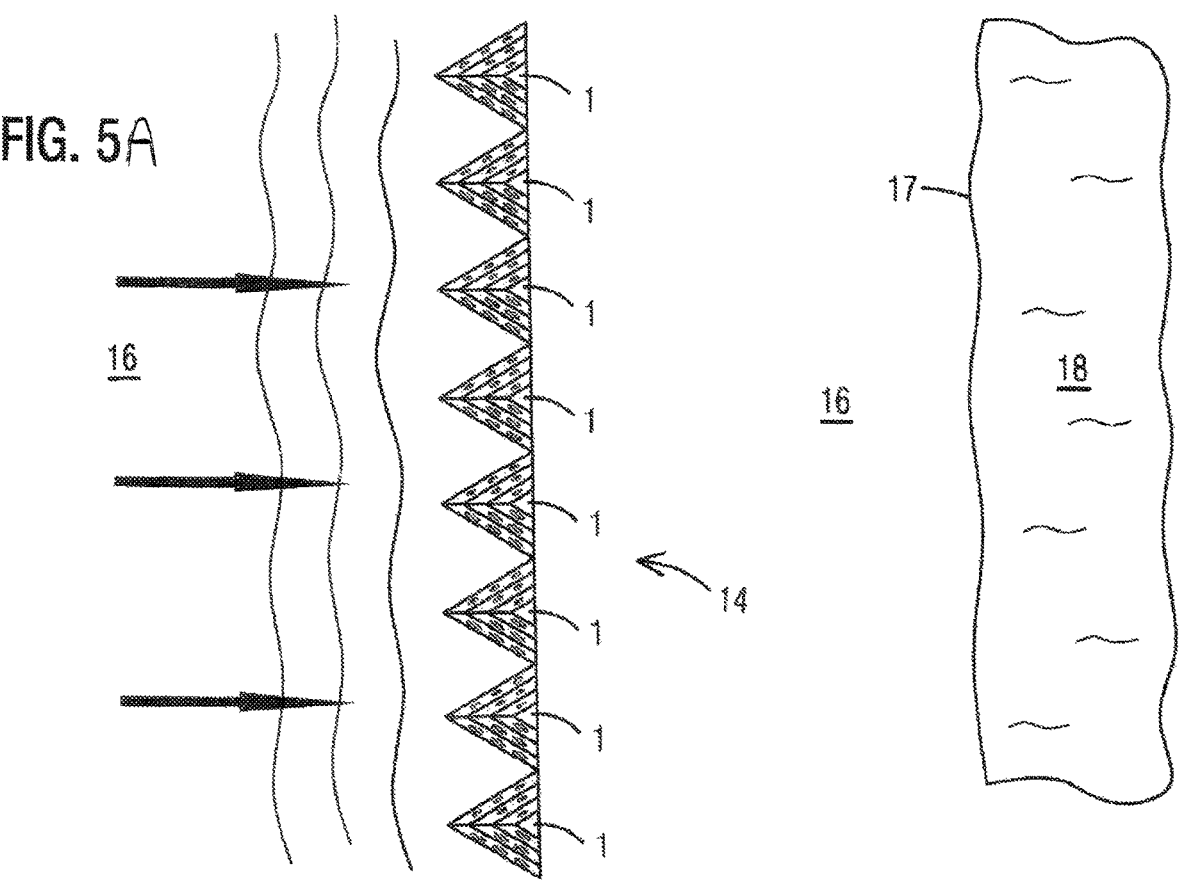

US 10,895,050 B1

WAVE DIVERTER DEVICE AND SYSTEM FOR RENOURISHING BEACHES

FIELD OF THE INVENTION

This invention relates to beach sand erosion and beach renourishment and more particularly, a device and system that diverts waves and the sand being carried in the waves and under currents onto a beach and prevents further erosion of the beach.

BACKGROUND OF THE INVENTION

Beach renourishment is a process of replacing sand lost from erosion. The sand is normally replaced from other sources. This is accomplished by trucking replacement sand to the beach or by pumping sand from offshore onto the beach.

These conventional methods are quite costly and many have adverse environmental impacts. In addition, conventional methods must be carried out on a reoccurring basis as most conventional methods of beach renourishment do nothing to solve the ongoing erosion problem.

Therefore, a device and system that diverts waves and the sand being carried in the waves and under currents onto a beach and prevents further erosion of the beach.

SUMMARY OF THE INVENTION

The primary object of the present invention is to provide a device and system that that diverts waves and the sand being carried in the waves and under currents onto a beach and prevents further erosion of the beach.

The present invention fulfills the above and other objects by providing a substantially pyramid-shaped wave diverter. A plurality of the wave diverters may be placed side-by-side off a coast line and under the surface of the water. The system of multiple wave diverters each have circular ports located on each side, some of which may vary in size. The system of wave diverters diverts the flow of sand toward the beach and prevents further erosion from the beach.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 5A is a top view of a system of wave diverters of the present invention forming a barrier line on a coastline of beach.

DESCRIPTION OF THE PREFERRED EMBODIMENTS

Figure 1:
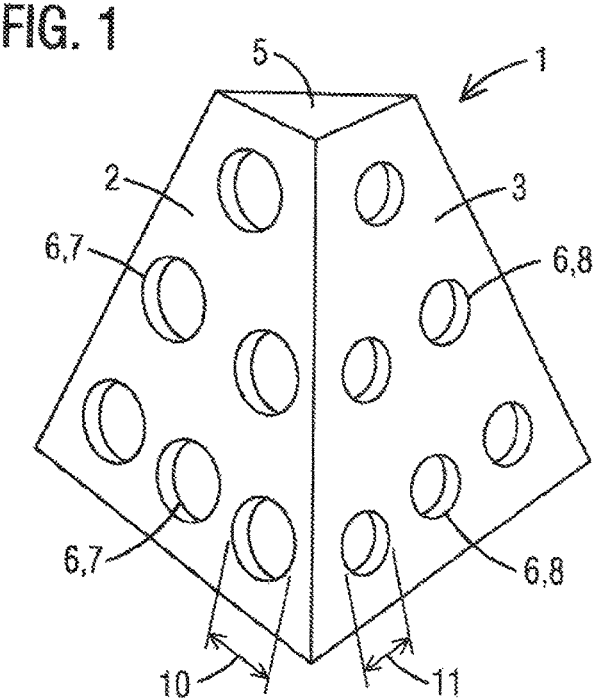
FIG. 1 is a perspective view of a wave diverter of the present invention showing a wave facing side and a right side panel thereof.
Figure 2:
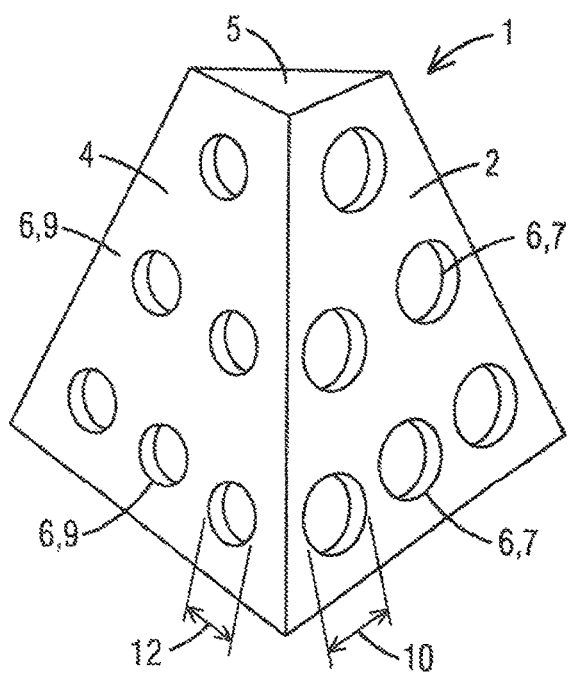
FIG. 2 is a perspective view of a wave diverter of the present invention showing a wave facing side and a left side panel thereof.
Figure 3:
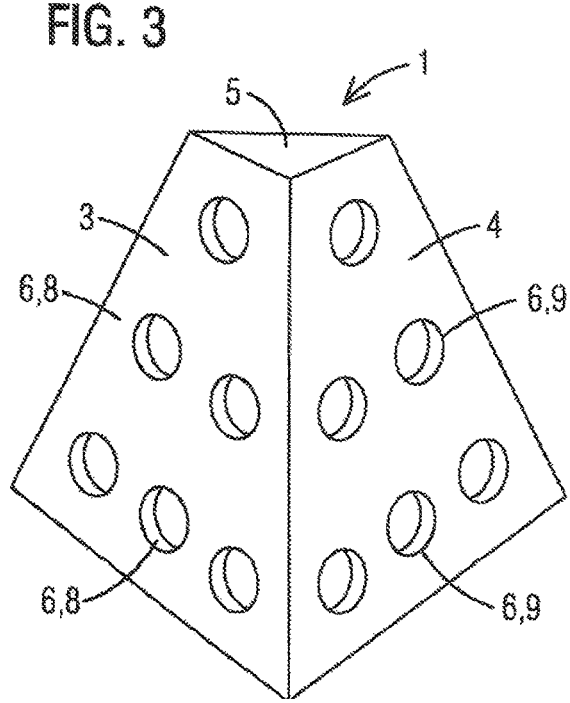
FIG. 3 is a perspective view of a wave diverter of the present invention showing a left facing side and a right facing panel thereof.

For purposes of describing the preferred embodiment, the terminology used in reference to the numbered accessories in the drawings is as follows:
 1. wave diverter, generally
 2. wave facing front panel
 3. right side panel
 4. left side panel
 5. top panel
 6. circular-shaped port
 7. front side port
 8. right side port
 9. left side port
 10. diameter of front side port
 11. diameter of right side port
 12. diameter of left side port
 13. mesh
 14. system of wave diverters
 15. barrier line
 16. ocean
 17. shoreline
 18. beach With reference to FIG. 1-3, a wave diverter 1 of the present invention is illustrated. The wave diverter 1 is substantially pyramid-shaped body having a forward wave facing front side panel 2, a right side panel 3 and a left side panel 4 each of which are preferably trapezoidal-shaped, thereby forming a plateau created by a horizontal triangular-shaped top panel 5. The front side panel 2, a right side panel 3 and a left side panel 4 may also be triangular-shaped, however, the horizontal triangular-shaped top panel 5 eliminates any points that may cause a hazard when the wave diverter 1 is placed in water.

The wave diverter 1 is preferably constructed from concrete or equivalent material to weigh the wave diverter 1 down in the water and provide enough structural integrity to withstand the constant ebb and flow of the tide and waves as water passes through and around the wave diverter 1. The front side panel 2, a right side panel 3 and a left side panel 4 form a hollow interior space within the wave diverter 1 that catches sand to further weigh down the wave diverter 1 and prevent the wave diverter 1 from moving.

A plurality of circular-shaped ports 6 are located on each of the front side panel 2, a right side panel 3 and a left side panel 4. The front side panel 2 preferably comprises a plurality of front side ports 7 located thereon that are preferably arranged in a triangular pattern. The right side panel 3 comprises a plurality of right side ports 8 located thereon that are preferably arranged in a triangular pattern. The left side panel 4 comprises a plurality of left side ports 9 located thereon that are preferably arranged in a triangular pattern. The diameter of the ports 6 preferably have varying diameters depending on the location of each port 6. As illustrated herein, each front side port 7 has a diameter 10 that is greater than a diameter 11 of each of the right side ports 8. Likewise, each front side port 7 has a diameter 10 that is greater than a diameter 12 of each of the left side ports 9.

The pyramid shape and placement of the ports 6 around the wave diverter 1 are designed to lower the pressure and speed of water as it passes around and through the wave diverter 1. The loss of pressure and speed of the water is accomplished by friction created as water travels around the wave diverter 1 and through the ports 6, thereby forming an eddy current which further slows each wave as they pass over the wave diverter 1. This loss of pressure and ensuing slowing of the water below the surface of each wave allows sand suspended in the water to release and fall to the ocean floor located between one or more wave diverters 1 and the beach.

Figure 4:
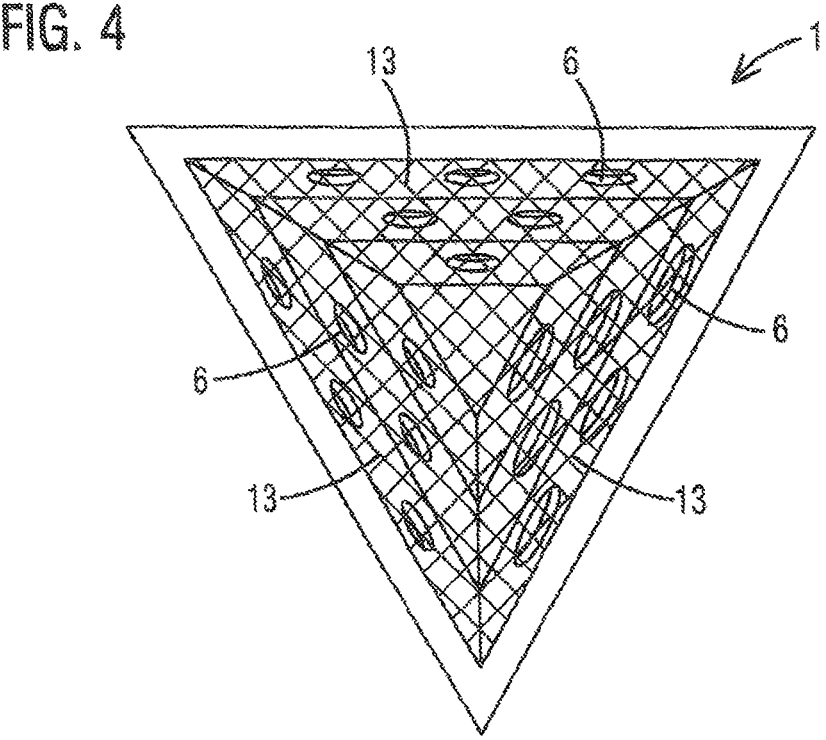
FIG. 4 is a bottom view of a wave diverter of the present invention having a mesh covering the ports of the wave diverter.

With reference to FIG. 4, a bottom view of a wave diverter 1 of the present invention is illustrated. The wave diverter preferably comprises an open bottom. A mesh 13 may be located on the wave diverter 1 to cover one or more of the ports 6. The mesh 13 works to further slow the flow of water down in and around the wave diverter 1. A hollow interior space catches sand to further weigh down the wave diverter 1 and prevent the wave diverter 1 from moving on the ocean floor.

Figure 5B:
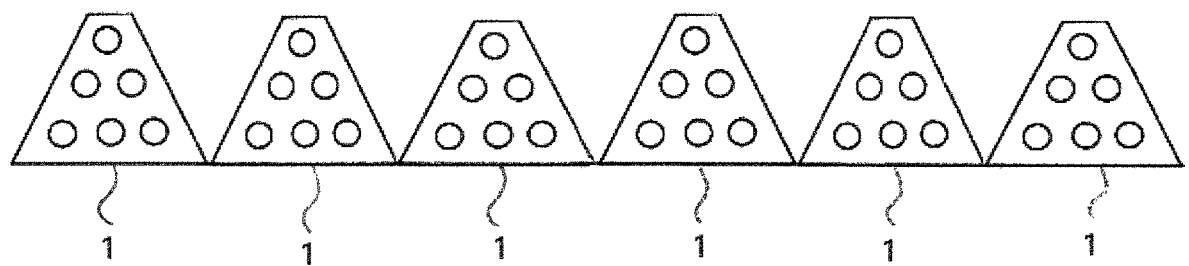
FIG. 5B is a side view of a system of wave diverters of the present invention forming a barrier line on a coastline of beach.

With reference to FIGS. 5A and B, a top view and a side view, respectively, of a system of wave diverters 14 of the present invention forming a barrier line 15 in the ocean 16 or equivalent body of water adjacent to a shoreline 17 of beach 18 are illustrated. The system of wave diverters 14 comprises a plurality of wave diverters 1 arranged in a side-by-side formation wherein the forward wave facing panel 2 of each wave diverter 2 is positioned to face the direction of oncoming waves. The system of wave diverters 14 may be arranged parallel to the shoreline 17 for waves that generally move in a perpendicular direction toward the shoreline 17. The system of wave diverters 14 may also be arranged in an arc and/or angle in relation to the shoreline 17 for waves that generally move in angled direction toward the shoreline 17.

The system of wave diverters 14 may comprise individual wave diverters 1 varying in sizes depending on the distance from the shoreline 16 and/or the depth of the ocean where each wave diverter 1 is being placed. As illustrated herein, the system of wave diverters 14 comprises a plurality of wave diverters 1 arranged in an arc that is angled in relation to the shoreline 17. The wave diverters 1 furthest from the shoreline 17 are larger in size than the wave diverters 1 located closer to the shoreline 17.

The placement of the system of wave diverters 14 is oriented to best change the direction of sand and slurry mix being carried by the waves and currents below the waves. Sand that is released from the water that slows as it passes through and around the wave diverters 1 builds up on the down drift side of the system of wave diverters 14 rather than being carried out to sea. The collected sand is pushed toward the shoreline 17 by waves and diverted currents passing between each of the side-by-side wave diverters 1 which actually experience an increase in velocity, thereby pushing the collected sand further toward the shoreline 17.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A system of wave diverters comprising:
   a plurality of wave diverters each having the same size and shape;
   said plurality of wave diverters arranged side-by-side to form a line of wave diverters in a body of water between a beach and oncoming waves;
   each of said plurality of wave diverters comprising a pyramid-shaped body having a front side panel, a right side panel and a left side panel;
   said front side panel, right side panel and left side panel of each of said plurality of wave diverters forming a hollow interior space within each of said plurality of wave diverters that catches sand to further weigh down each of said plurality of wave diverters under water;
   said front side panel of each of said plurality of wave diverters being trapezoidal-shaped;
   said right side panel of each of said plurality of wave diverters being trapezoidal-shaped;
   said left side panel of each of said plurality of wave diverters being trapezoidal-shaped;
   each of said plurality of wave diverters having a horizontal triangular-shaped top panel forming a flat top of each of said plurality of wave diverters;
   a plurality of front side circular-shaped ports located on the front side panel of each of said plurality of wave diverters;
   a plurality of right side circular-shaped ports located on the right side panel of each of said plurality of wave diverters;
   a plurality of left side circular-shaped ports located on the left side panel of each of said plurality of wave diverters;
   each of the wave diverters having at least one lower corner touching an adjacent wave diverter to create said line of wave diverters wherein the wave diverters are separated by triangular-shaped voids; and
   said triangular shaped voids causing friction with passing water as waves pass around and through the plurality of wave diverters arranged to allow sand suspended in passing water to release from the passing water and fall to the ocean floor as the passing water is slowed passing though the triangular-shaped voids.

2. The system of wave diverters of claim 1 wherein:
   said line of wave diverters form an arc between oncoming waves and the beach.

* * * * *